US008532003B2

(12) United States Patent
Pandey et al.

(10) Patent No.: US 8,532,003 B2
(45) Date of Patent: Sep. 10, 2013

(54) APPARATUS AND METHOD FOR MANAGING PACKET ROUTING THROUGH INTERNALLY-POWERED NETWORK DEVICES IN WIRELESS SENSOR NETWORKS

(75) Inventors: Raju Pandey, Davis, CA (US); Rituparna Ghosh, Folsom, CA (US)

(73) Assignee: Synapsense Corporation, Folsom, CA (US)

( * ) Notice: Subject to any disclaimer, the term of this patent is extended or adjusted under 35 U.S.C. 154(b) by 698 days.

(21) Appl. No.: 12/287,093

(22) Filed: Oct. 3, 2008

(65) Prior Publication Data

US 2010/0085903 A1  Apr. 8, 2010

(51) Int. Cl.
*G08C 17/00* (2006.01)

(52) U.S. Cl.
USPC ........ 370/311; 370/254; 370/351; 455/127.5; 455/343.1; 455/343.2; 455/343.5; 455/574

(58) Field of Classification Search
USPC .......... 370/254, 311, 351; 455/127.5, 343.1, 455/343.2, 343.5, 574
See application file for complete search history.

(56) References Cited

U.S. PATENT DOCUMENTS

| | | | |
|---|---|---|---|
| 4,866,606 A | 9/1989 | Kopetz | |
| 5,379,290 A | 1/1995 | Kleijne | |
| 5,408,506 A | 4/1995 | Mincher et al. | |
| 5,515,369 A | 5/1996 | Flammer, III | |
| 5,896,412 A | 4/1999 | Levanon | |
| 6,028,857 A | 2/2000 | Poor | |
| 6,208,247 B1 * | 3/2001 | Agre et al. | 340/539.19 |
| 6,304,556 B1 | 10/2001 | Haas | |
| 6,404,756 B1 | 6/2002 | Whitehill | |
| 6,442,596 B1 | 8/2002 | Dyer | |
| 6,480,497 B1 | 11/2002 | Flammer, III | |
| 6,590,928 B1 | 7/2003 | Haartsen | |
| 6,735,630 B1 | 5/2004 | Gelvin | |

(Continued)

FOREIGN PATENT DOCUMENTS

| | | |
|---|---|---|
| CA | 2616715 | 2/2007 |
| CN | 101401480 | 4/2009 |

(Continued)

OTHER PUBLICATIONS

Kanzaki, Akimitsu et al.; Dynamic TDMA Slot Assignments in Ad Hoc Networks; 17th Int'l Conference on Advanced Information Networking and Applications; Mar. 2003; pp. 330-335.

(Continued)

*Primary Examiner* — Arnold Kinkead
*Assistant Examiner* — Richard Tan
(74) *Attorney, Agent, or Firm* — Inventive Patent Law P.C.; Jim H. Salter

(57) ABSTRACT

Various embodiments provide an apparatus and method for managing packet routing through internally-powered network devices in wireless sensor networks. An example embodiment includes a hybrid network having an externally-powered node and an internally-powered node, the method includes configuring a role that the internally-powered node will take during an operations phase of the hybrid network, the role including whether the internally-powered node will act as a router or a non-router; demoting the internally-powered node to a non-router role if the internally-powered node is not needed for routing; and promoting the internally-powered node to a router role if the internally-powered node is needed for routing.

18 Claims, 5 Drawing Sheets

(56) References Cited

U.S. PATENT DOCUMENTS

| | | | |
|---|---|---|---|
| 6,807,165 B2 | 10/2004 | Belcea | |
| 6,850,502 B1 | 2/2005 | Kagan | |
| 6,856,591 B1 | 2/2005 | Ma et al. | |
| 6,859,831 B1 | 2/2005 | Gelvin | |
| 7,010,392 B2 | 3/2006 | Bash | |
| 7,020,701 B1 | 3/2006 | Gelvin | |
| 7,031,329 B2 | 4/2006 | Lipsanen | |
| 7,031,870 B2 | 4/2006 | Sharma | |
| 7,086,603 B2 | 8/2006 | Bash | |
| 7,151,769 B2 * | 12/2006 | Stanforth et al. | 370/351 |
| 7,176,808 B1 | 2/2007 | Broad | |
| 7,180,915 B2 | 2/2007 | Beyer | |
| 7,272,129 B2 | 9/2007 | Calcev | |
| 7,313,461 B2 | 12/2007 | Sharma et al. | |
| 7,463,644 B2 | 12/2008 | Zhu | |
| 7,502,360 B2 | 3/2009 | Liu | |
| 7,680,092 B2 | 3/2010 | Van Laningham | |
| 2002/0073152 A1 | 6/2002 | Andrew | |
| 2003/0067745 A1 | 4/2003 | Patel et al. | |
| 2003/0067892 A1 | 4/2003 | Beyer | |
| 2005/0024826 A1 | 2/2005 | Bash | |
| 2005/0030968 A1 | 2/2005 | Rich et al. | |
| 2005/0074025 A1 | 4/2005 | Shao et al. | |
| 2005/0129051 A1 | 6/2005 | Zhu | |
| 2005/0173549 A1 | 8/2005 | Bash | |
| 2005/0201340 A1 | 9/2005 | Wang | |
| 2005/0213612 A1 | 9/2005 | Pister | |
| 2005/0237928 A1 | 10/2005 | Le Scolan et al. | |
| 2005/0239411 A1 | 10/2005 | Hazra | |
| 2006/0029060 A1 | 2/2006 | Pister | |
| 2006/0029061 A1 | 2/2006 | Pister | |
| 2006/0034191 A1 | 2/2006 | Sahinoglu | |
| 2006/0126501 A1 | 6/2006 | Ramaswamy | |
| 2006/0149408 A1 | 7/2006 | Speetzer | |
| 2006/0161909 A1 | 7/2006 | Pandey | |
| 2006/0198346 A1 | 9/2006 | Liu | |
| 2006/0215581 A1 | 9/2006 | Castagnoli | |
| 2006/0215583 A1 | 9/2006 | Castagnoli | |
| 2006/0225446 A1 | 10/2006 | Bash | |
| 2006/0245360 A1 | 11/2006 | Ensor et al. | |
| 2006/0268791 A1 | 11/2006 | Cheng | |
| 2006/0269028 A1 | 11/2006 | Bley | |
| 2007/0050523 A1 | 3/2007 | Emeott | |
| 2007/0116060 A1 | 5/2007 | Qu | |
| 2007/0208992 A1 | 9/2007 | Koren | |
| 2007/0211686 A1 | 9/2007 | Belcea | |
| 2007/0258508 A1 | 11/2007 | Werb | |
| 2008/0008138 A1 | 1/2008 | Pun | |
| 2008/0019265 A1 | 1/2008 | Alluisi et al. | |
| 2008/0019302 A1 | 1/2008 | Nagarajan et al. | |
| 2008/0043707 A1 | 2/2008 | Ren | |
| 2008/0095222 A1 | 4/2008 | Van Laningham | |
| 2008/0151801 A1 | 6/2008 | Mizuta | |
| 2008/0269932 A1 | 10/2008 | Chardon | |
| 2008/0298450 A1 | 12/2008 | Zhang | |
| 2009/0010190 A1 * | 1/2009 | Gong | 370/311 |
| 2009/0109992 A1 | 4/2009 | Lurie et al. | |
| 2009/0147714 A1 * | 6/2009 | Jain et al. | 370/311 |

FOREIGN PATENT DOCUMENTS

| | | |
|---|---|---|
| DE | 202006019810 | 5/2007 |
| EP | 1719301 | 11/2006 |
| EP | 191184 | 4/2009 |
| JP | 2004-336779 | 11/2004 |
| JP | 2006-311549 | 11/2006 |
| JP | 2009504010 | 1/2009 |
| KR | 10-0646748 | 11/2006 |
| KR | 10-2007-0009390 | 1/2007 |
| KR | 10-2007-0105731 | 10/2007 |
| WO | WO2005083953 | 9/2005 |
| WO | WO2007015962 | 6/2007 |
| WO | WO2008021278 | 7/2008 |

OTHER PUBLICATIONS

Lee, Myung J. et al.; Emerging Standards for Wireless Mesh Technology; IEEE Wireless Communications; Apr. 2006; vol. 13; pp. 56-63.

Wei Li et al.; Dynamic TDMA Slot Assignment Protocol for Multihop Ad Hoc Networks; Int'l Conference on Communication Technology; Nov. 2006; pp. 1-4.

C. Frank et al., Proceedings of the 3rd International Conference on Embedded Networked Sensor Systems, pp. 230-242, 02-04; Nov. 2005.

PCT/US2009/004490; SynapSense Corp.; Feb. 24, 2010; ISR and Written Opinion.

* cited by examiner

APPARATUS AND METHOD FOR MANAGING PACKET ROUTING THROUGH INTERNALLY-POWERED NETWORK DEVICES IN WIRELESS SENSOR NETWORKS

CROSS-REFERENCE TO RELATED PATENT APPLICATION

This non-provisional patent application is related to the U.S. patent application Ser. No. 12/001,884, filed Dec. 12, 2007, entitled, "APPARATUS AND METHOD FOR ADAPTIVE DATA PACKET SCHEDULING IN MESH NETWORKS", and assigned to the same assignee as the present patent application.

TECHNICAL FIELD

The disclosed subject matter relates to the field of network communications, and more particularly to power management in mesh networks.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2008 SynapSense Corporation, All Rights Reserved.

BACKGROUND

Mesh networking is a way to route data and instructions between nodes. A node can be any device connected to a computer network. Nodes can be computers, routers, or various other networked devices. On a TCP/IP network, a node is any device with an Internet Protocol (IP) address. Mesh networking allows for continuous connections and reconfiguration around broken or blocked paths by "hopping" from node to node until the destination is reached. Mesh networks differ from other networks in that the component parts can all connect to each other via multiple hops, and they generally are not mobile devices. In a packet-switching network, a hop is the trip a data packet takes from one router or intermediate node in a network to another node in the network. On the Internet (or a network that uses TCP/IP), the number of hops a packet has taken toward its destination (called the "hop count") is kept in the packet header.

Wireless mesh networks employ intelligent nodes typically including a wireless (e.g., radio) transmitter and receiver, a power source, input devices, sometimes output devices, and an intelligent controller, such as a programmable microprocessor controller with memory. In the past, wireless mesh networks have been developed having configurations or networks for communication that are static, dynamic or a hybrid of static and dynamic. Power for these networks has been supplied either via wires (i.e., the nodes are "plugged in" or externally powered) or from batteries in each node (i.e., the nodes are internally powered). Networks that employ a combination of externally powered nodes and internally powered nodes can be denoted hybrid networks. As the size, power, and cost of the computation and communication requirements of these devices has decreased over time, battery-powered wireless nodes have gotten smaller; yet, the computing demands on the wireless nodes have increased.

Wireless mesh network technology can be used for deploying sensors as nodes in a variety of different environments for monitoring diverse parameters such as, for example, temperature, pressure, particle counts, and humidity. These types of networks can be denoted wireless sensor networks (WSN). Each sensor in a WSN is typically powered by a battery and therefore has a limited energy supply and operational capability. Because the sensors are constantly monitoring the environment and communicating with other nodes, it is important to efficiently manage the power consumed by each sensor. Further, it is important to monitor the operational status of each of the sensors.

Given that many WSN devices are internally-powered (e.g., battery), the overall network lifetime depends on the efficiency with which sensing, computing, and data transmission by the sensors can be achieved. Because the power requirements for wireless communication by the sensors are orders of magnitude higher than the other sensor operations, it is critical that operation of the radios on these devices be managed carefully. This is primarily achieved by turning the radio on only when devices need to send and/or receive data. The operational lifetime of the network, thus, depends on the ability to effectively manage the operation of the radios in the wireless network nodes.

The sensors in a WSN must efficiently manage the network topology so that network packets are properly routed to their destination. In order to carry out this task, the WSN network devices must wake up periodically, activate their radios, and listen for a data communication from another network device to determine if any data packet needs to be routed. Most of the battery power in a wireless network device is consumed when the device must wake up more often, turn the radio on, and listen for a data communication from another network device. Thus, the process of data path maintenance and packet routing through wireless devices in a WSN needs to be highly efficient in order to extend the operational lifetime of the network.

U.S. Pat. No. 5,515,369 describes a technology for use in a wireless packet communication system having a plurality of nodes, each having a transmitter and a receiver, the receiver at each node is assigned a seed value and is provided with a channel punchout mask. A node uses its seed value and punchout mask to generate a specific randomly ordered channel hopping band plan on which to receive signals. A node transmits its seed value and punchout mask to target nodes with which it wants to establish communication links, and those target nodes each use the seed value and punchout mask to generate the randomly ordered channel hopping band plan for that node. Subsequently, when one of the target nodes wishes to transmit to the node, the target node changes frequency to the frequency of the node according to that node's band plan.

U.S. Pat. No. 6,590,928 describes a wireless network including master and slave units. The master sends a master address and clock to the slaves. Communication is by means of a virtual frequency hopping channel whose hopping sequence is a function of the master address, and whose phase is a function of the master clock. Transmitted inquiry messages solicit slave address and topology information from the slaves, which may be used to generate a configuration tree for determining a route for a connection between the master and slave units.

U.S. Pat. No. 6,480,497 describes a technology for use in a mesh network communication system, where net throughput is optimized on the link between the communicating nodes by dynamically modifying signal characteristics of the signals transmitted between nodes in response to performance metrics which have been determined from analysis at the receivers for the corresponding links. The signal characteristics can be the data rate, modulation type, on-air bandwidth, etc. The performance metrics are calculated based on data-link on-air characteristics of received signals.

U.S. Patent Application No. 20070258508 describes a method and apparatus for communication in a wireless sensor network. In one embodiment, one or more routers in a network may be available for communication with one or more star nodes at a randomized time and/or frequency. A connectivity assessment, which may be performed at several different frequencies and/or times, may be performed to evaluate the quality of communications between devices in the network. Primary and secondary communication relationships may be formed between devices to provide for system redundancy. One or more proxies may be maintained where each proxy includes a status of one or more devices in the network, e.g., one or more star nodes or routers. Proxies may be used to handle information requests and/or status change requests, e.g., a proxy may be requested to change a communication relationship between devices in the network and may generate command signals to cause the corresponding devices to make the change.

Thus, an apparatus and method for managing packet routing through internally-powered network devices in wireless sensor networks are needed.

BRIEF DESCRIPTION OF THE DRAWINGS

Embodiments illustrated by way of example and not limitation in the figures of the accompanying drawings, in which.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is provided an apparatus and method for managing packet routing through internally-powered network devices in wireless sensor networks. A particular embodiment relates to wireless data networks and more particularly to a multiple-hop wireless data communications employing a packet-switched time-sharing communications protocol. A particular embodiment has application to data collection from an array of sensors disposed in a network topology wherein at least two intelligent communication nodes are within reliable radio communication range within an array of peer communication nodes. The particular embodiment of an example system and method described herein presents an adaptive approach for managing packet routing through internally-powered network devices in wireless sensor networks to extend the operational lifetime of the network. The network and node configuration in a particular embodiment are described in more detail below.

In a particular embodiment described herein, the wakeup time periods for wireless network devices (e.g., internally-powered network devices) can be reduced significantly if the process of path maintenance and packet routing can be handed off primarily to network devices that can be powered externally. Network efficiency is improved if primary responsibility for packet routing is handled by externally powered devices and battery powered devices are only used on demand when necessary. In this case, the externally powered network devices (e.g., routers) are awake all the time, monitoring for data packets, and routing data packets as they arrive; while non-externally-powered network devices (e.g., wireless routers) can act as routers only when their services are required.

Figure 1:
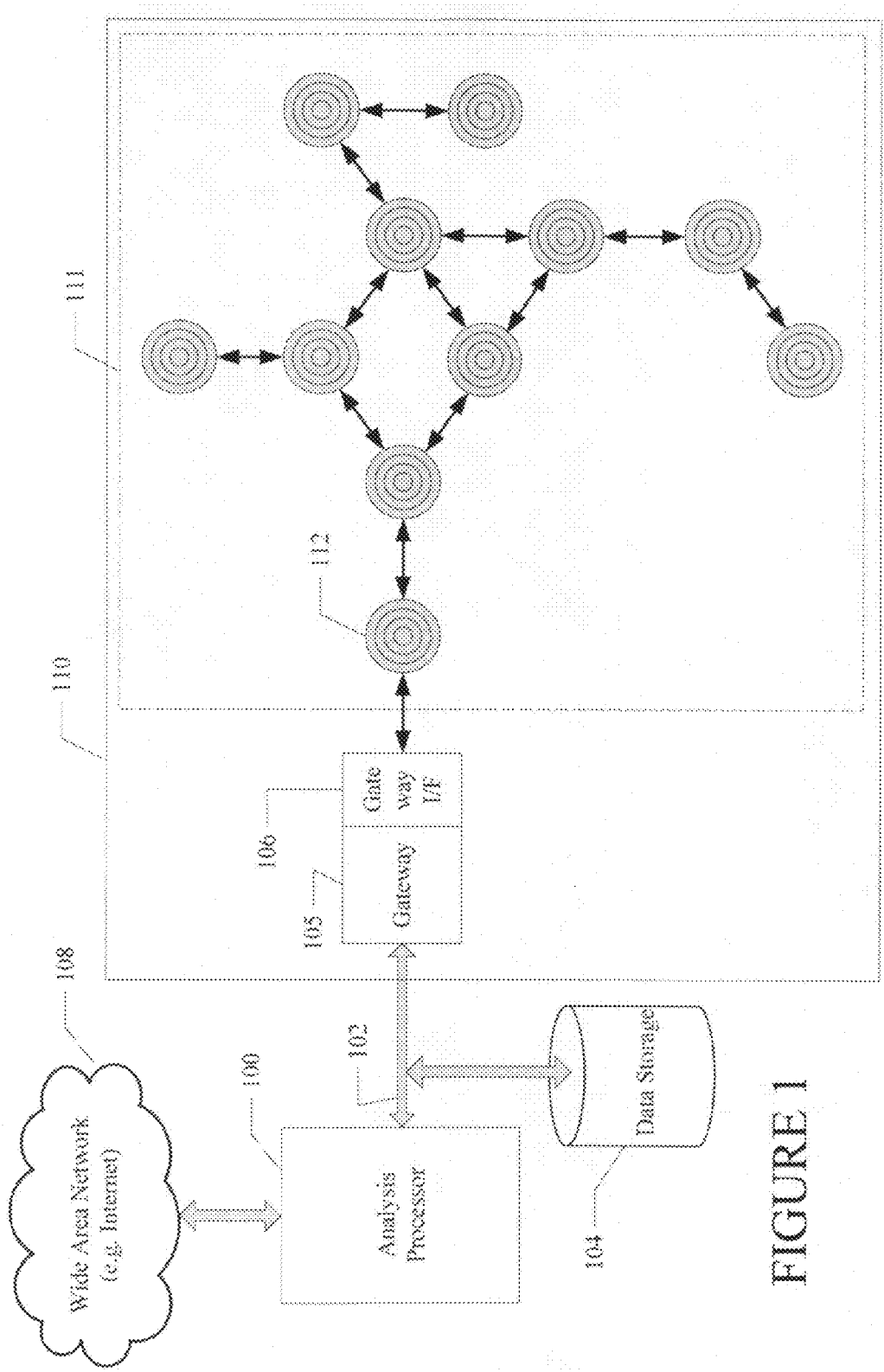
FIG. 1 illustrates a mesh network environment in which various embodiments can operate.

FIG. 1 illustrates a network environment of an example embodiment including a mesh network 110 of wireless sensors 112. Each of the sensors can be implemented as the combination of components illustrated in FIG. 2 and described in more detail below. Wireless sensor network (WSN) 110 includes a set of wireless sensors 112 and a gateway device 105 (collectively denoted nodes), each in data communication with others of its proximate neighbor nodes. The nodes 112 can communicate using established data communication protocols, typically at the Media Access Control (MAC) Layer. The MAC Layer is one of two sub-layers that make up the Data Link Layer of the well-known OSI networking model. The MAC layer is responsible for moving data packets to and from the network interface of one node to another node across a shared channel. A node can be any vertex or intersection in the communication network 110. A node may be passive or intelligent. In a particular embodiment, a node is assumed to be an intelligent node capable of receiving and analyzing information, taking certain actions as a result of received information, including the storing of received or processed information, modifying at least part of received information, and in some instances originating and retransmitting information. The details of a node of a particular embodiment are detailed in FIG. 2.

Referring still to FIG. 1, data packets or messages can be directed between any two nodes of the WSN 110 as each node has a unique identifier. A data packet or message is a self-contained unit of transmitted information. Typically, a data packet has a header, a payload, and an optional trailer. A link is a path which originates at one node and terminates at one other node. A link or path between nodes may include multiple hops between a plurality of intermediate nodes prior to reaching a destination node. The transfer of messages between two nodes of WSN 110 in a unicast or broadcast transmission is termed a local communication.

Each of the nodes 112 of WSN 110 can also communicate with a gateway 105 via a gateway interface 106. The gateway 105 provides a connection between the WSN 110 and an analysis processor 100. In an alternative embodiment, gateway 105 and gateway interface 106 can be located outside of the WSN 111. Gateway 105 can be implemented as any node of WSN 110. It will be apparent to those of ordinary skill in the art that in the description herein, variations of the WSN are still within the scope of the appended claims. Analysis processor 100 can be used to receive sensor data from any of the nodes 112 of WSN 110 via gateway 105 and to analyze the sensor data for aggregated environmental monitoring and control. Gateway 105 and analysis processor 100 can use a conventional data storage device 104 for data storage and retrieval. Analysis processor 100 can also include a connection to a wide area network 108, such as the Internet. In this manner, the gateway 105 and the other nodes of WSN 110 can obtain access to the Internet.

Gateway 105 can also provide synchronization timing for the nodes 112 of WSN 110. Gateway 105 can send periodic messages (also denoted as beacons or heartbeats) to each of the nodes 112 of WSN 110. Alternatively, any of the nodes 112 of WSN 110 can be designated to send the beacon to other nodes on the network. These periodic messages can include a timing signal to which each of the nodes 112 can synchronize their internal timers. Similarly, messages from gateway 105 to each of the nodes 112 can be used to provide system status, configuration, and control settings for the nodes of WSN 110. In an alternative embodiment, any of the nodes of the network or an agent may provide a network management message including the synchronization (timing) signal for the other network nodes. Alternatively, an external signal source may be used as a basis for the time synchronization of network nodes. The transfer of messages between the gateway 105 and each of the nodes 112 or between a node 112 and all other nodes of WSN 110 in a broadcast or multicast transmission is termed a global communication. According to a particular embodiment, communication between nodes 112 and/or between nodes 112 and gateway 103 occurs only at specific times and on specific channels for local and global data communications.

The WSN 110 can be configured in any of a variety of ways. Nodes 112 can be added, removed, or moved within the array of nodes of WSN 110. Each of the nodes of WSN 110 includes functionality to join or reconfigure itself in the WSN 110 when a node is added or moved. As part of this functionality, each node 112 can discover its neighbor nodes and automatically negotiate and establish communication paths with those neighbors. A node can be in data communication with neighbors that are within the radio reception range of the node. Depending on the strength of the wireless transceivers (e.g., radios) within each node of WSN 110, the distance between neighbor nodes is variable. Given that in some applications the environment in which WSN 110 is being used may be subject to radio interference, it is possible that the wireless data communications between nodes may be disrupted. In these cases, each node can sense the loss of data communications with a neighbor and may reconfigure itself to use alternate data paths through other functioning nodes of WSN 110. As such, the WSN 110 is highly adaptable to changing conditions in the environment and in the configuration of the wireless network.

Figure 2:
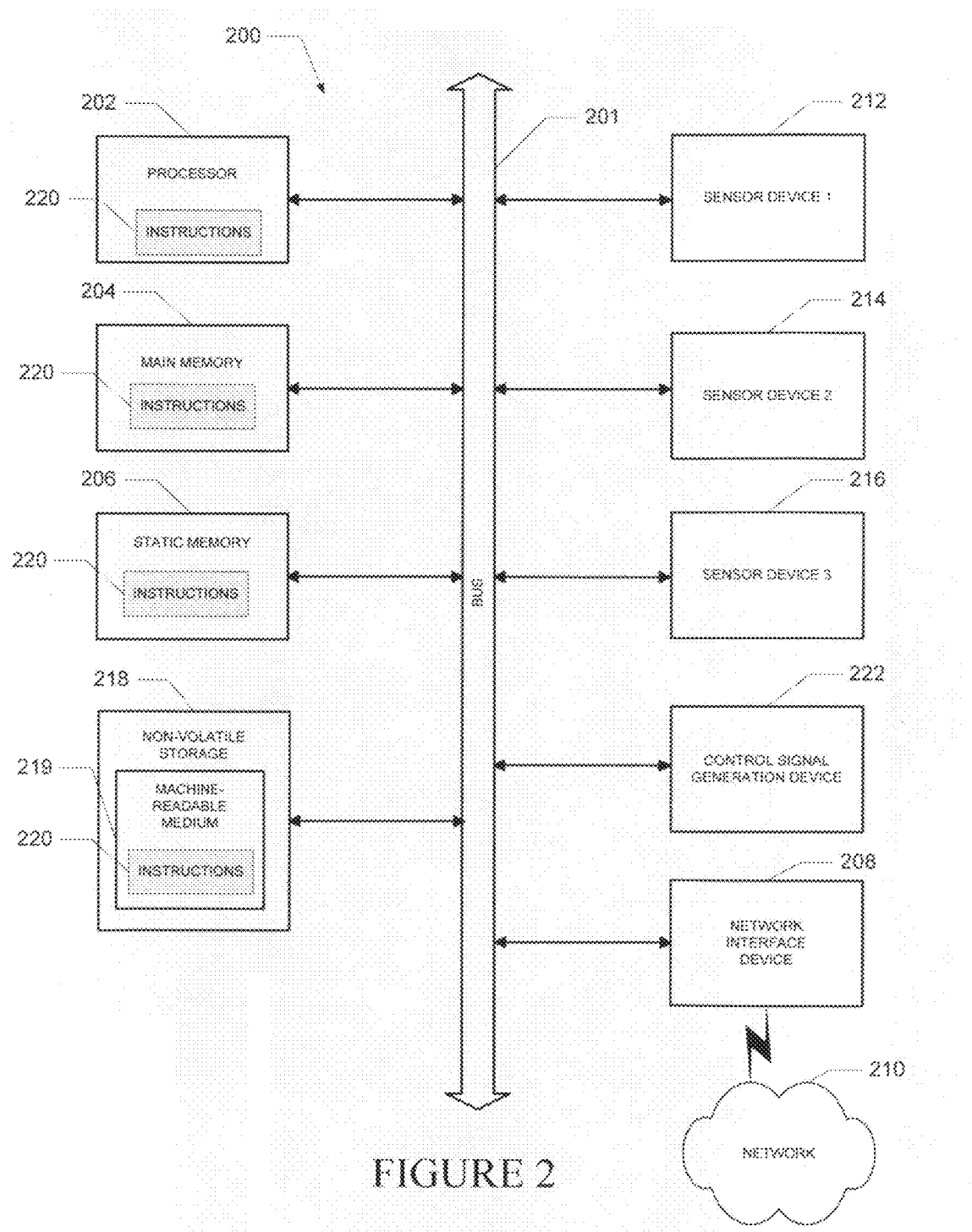
FIG. 2 illustrates an example embodiment of a node that can operate in a mesh network.

FIG. 2 shows a diagrammatic representation of a machine in the example form of a network node or sensor unit 200 within which a set of instructions, for causing the node to perform any one or more of the methodologies discussed herein, may be executed. In alternative embodiments, the node operates as a standalone device or may be connected (e.g., networked) to other machines. In a networked deployment, the node may operate in the capacity of a server or a client machine in client-server network environment, or as a peer machine in a peer-to-peer (or distributed) network environment, such as a mesh network. The node may be a computer, an intelligent sensor, a logic device, an application specific integrated circuit (ASIC), a field programmable gate array (FPGA), a process logic controller (PLC), a hard-wired module, a network router, gateway, switch or bridge, or any machine capable of executing a set of instructions (sequential or otherwise) that specify actions to be taken by that machine. Further, while a single machine is illustrated in FIG. 2, the term "machine" or "node" shall also be taken to include any collection of machines that individually or jointly execute a set (or multiple sets) of instructions to perform any one or more of the methodologies discussed herein.

The example node 200 of a particular embodiment includes a processor 202 (e.g., a central processing unit (CPU)), a main memory 204 and optionally a static memory 206, which communicate with each other via a bus 201. The node 200 may further include one or more sensor devices 212, 214, and 216. These sensor devices can include temperature sensors, humidity sensors, air flow sensors, particle counters, and/or other types of sensors for detecting and measuring a desired condition. The sensor devices 212, 214, and 216 can also include security devices, such as motion detectors, acoustical detectors, seismic detectors, vibration detectors, metal detectors, magnetic anomaly detectors, explosives detection, and the like. Additionally, sensor devices 212, 214, and 216 can also include process control devices, such as conveyor motion activation and status, robotic system activation and status, machine system activation and status, and the like. In general, sensor devices 212, 214, and 216 can include any sensors for detecting and measuring a desired condition within an environmental management system, process control system, building management system, or the like.

The node 200 may further include a non-volatile memory 218, a control signal generation device 222, and a network interface device 208 (e.g., a radio transceiver). The non-volatile memory 218 includes a machine-readable medium 219 in which is stored one or more sets of instructions (e.g., software 220) embodying any one or more of the methodologies or functions described herein. The instructions 220 may also reside, completely or partially, within the main memory 204, the static memory 206, and/or within the processor 202 during execution thereof by the node 200. The main memory 204, static memory 206, and the processor 202 also may constitute machine-readable media. The software, instructions, and/or related data 220 may further be transmitted or received over a network 210 via the network interface device 208. The network interface device 208, in a wireless node configuration of one embodiment, may include a radio transceiver for sending and receiving data to/from network 210 using a wireless data transfer protocol, such as the family of 802.11 standards from IEEE. In this manner, node 200 can perform wireless data communications with other nodes of WSN 110. The control signal generation device 222 can be used to control the operation of any system external to the WSN 110, such as an environmental management system, process control system, building management system or other device or system that can alter the conditions being monitored by sensors 212, 214, and 216.

Typically in wireless network systems, the wireless data transceivers (e.g., radios) in the network nodes consume the most electrical power and represent the largest drain on the node's battery power. As such, the radio should be turned off for most of the time to increase the battery lifetime of the nodes. In an example embodiment, all nodes of WSN 110 are time synchronized. Each node wakes up for a short period of time for radio communication with other nodes or the gateway. Then, the node's radio is shut off and the node sleeps until the next scheduled communication cycle.

In a particular example embodiment described herein, a method and apparatus is presented that addresses the complexity of managing hybrid mesh networks that include both internally-powered or self-powered (e.g., battery-powered) and externally-powered (e.g., line powered) network devices. The method and system of a particular embodiment seamlessly enables:

internally-powered network devices to go into long sleep modes if they can directly reach externally-powered routers;

internally-powered network devices to assume the role of a router if there are no externally-powered routers available; and internally-powered network devices to cede the routing duties to externally-powered routers once externally-powered routers become available for packet routing.

The particular embodiment defines a hybrid framework of network devices and network topologies to exploit resource rich devices for overall improvement of throughput, power efficiency, and reliability of the WSN. The desired goals of the particular embodiment include: 1) prolonged network lifetime, 2) automated router configuration management, and 3) automated recovery from externally-powered and/or internally-powered router failures. These and other advantages of the various embodiments described herein will be explained in more detail below.

Figure 3:
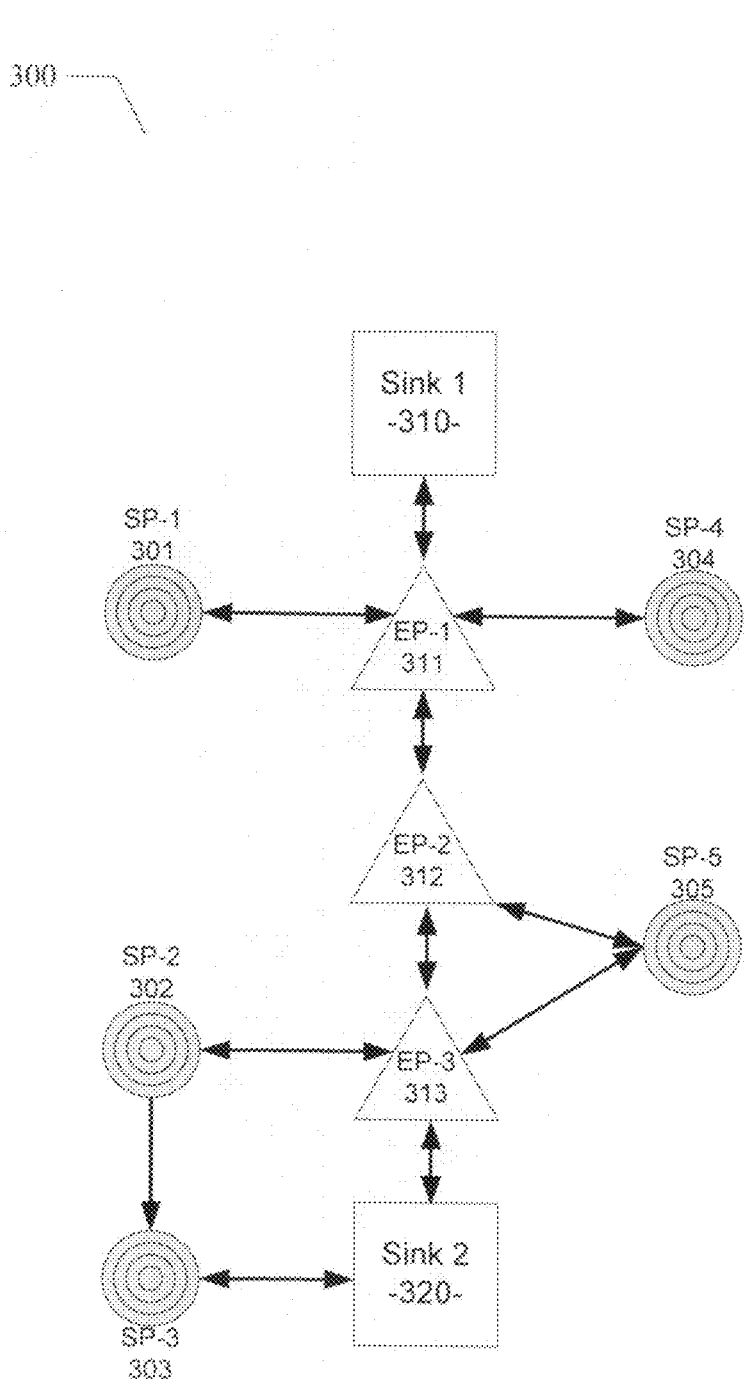
FIGS. 3 and 4 illustrate various configurations of three kinds of network devices in the hybrid network of an example embodiment.
Figure 4:
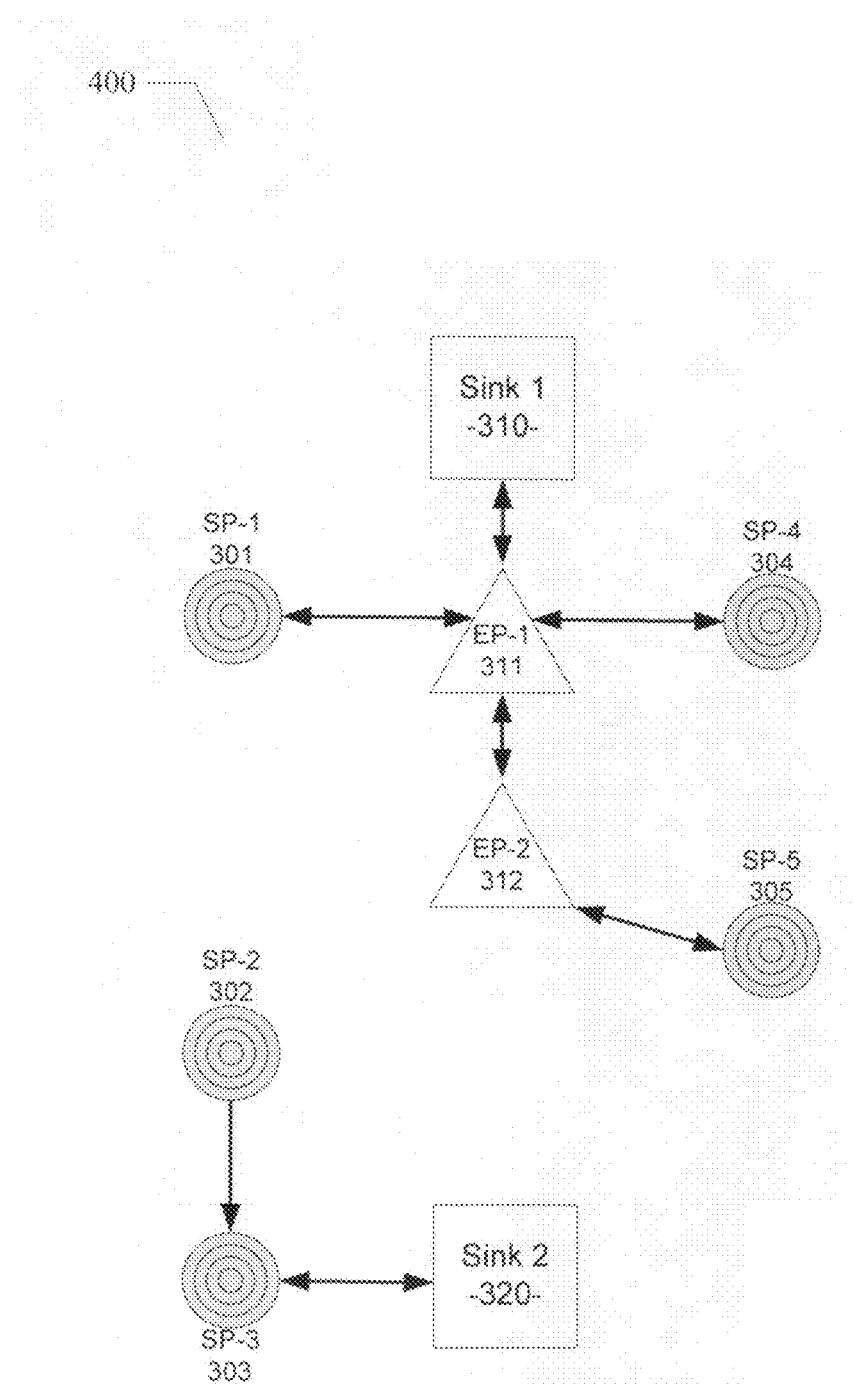

Referring now to FIGS. 3 and 4, an example embodiment illustrates three kinds of devices in the network: (i) externally-powered sinks 310 and 320 that can be end points for network data, (ii) externally-powered (e.g., line-powered) network devices 311, 312, and 313, and (iii) internally-powered (battery-powered) network devices 301-305. In the particular embodiment described, every externally-powered network device and every internally-powered network device can act as a router of data messages (packets) through the WSN. Routers form the mesh backbone and have the ability to forward a received data packet. Although each network device (e.g., node) may act as a router, it may not be efficient in practice to implement a particular WSN in this manner; because, internally-powered network devices may consume power at a faster rate than desired. As a result, the network operational lifespan will be shorter than desired. The various embodiments described herein can efficiently and automatically configure message routing responsibilities for each of the network devices to improve or extend the network operational lifespan.

As shown in the example embodiment of FIGS. 3 and 4, externally-powered network devices 311, 312, and 313 form the routing backbone, and are used to transfer data from internally-powered devices 301-305. Externally-powered sinks 310 and 320 can act as end points for network data (e.g., sensor data) transferred through network 300. In the particular embodiment of network 300 shown in FIG. 3, internally-powered node 302, for example, can route data either through externally-powered node 313 or through internally-powered node 303. As described above, routing network data through an internally-powered node consumes power on the internally-powered node and thereby decreases the operational life of the node. On the other hand, routing network data through an externally-powered node does not decrease the operational life of the externally-powered node. As such, to extend the network operational lifespan, it is therefore most efficient to configure a power-conserving routing policy for the network nodes of a particular hybrid network to route data packets through externally-powered nodes where possible and to minimize routing through internally-powered nodes. In the example embodiment described herein, this power-conserving routing policy ensures that in the presence of externally-powered routers, internally-powered node 302, for example, will first attempt to route data through externally-powered router 313. However, if the externally-powered router 313 fails or node 302 cannot establish a communication path to node 313, as shown in the example network 400 of FIG. 4, internally-powered node 302 can alternatively use internally-powered node 303 to route data packets to sink node 320. Thus, in a particular embodiment, network devices can be configured to employ a power-conserving routing policy where a sending node first attempts to route data packets through an externally-powered node. If unable to route data packets through an externally-powered node, the sending node then attempts to route data packets through an internally-powered node until a data transfer is completed.

One aspect of implementing a power-conserving network routing policy in a particular embodiment is to automatically identify and configure the roles the internally-powered network devices will take during the operation of the hybrid network. During an initialization phase of an example embodiment, described in more detail below, each of the internally-powered network devices of a particular hybrid network can initially determine if the self-powered network device needs to act as a network router (or alternatively should act as a non-router). A non-router is a network node that does not perform data packet routing functions. Each of the externally-powered network devices of the particular hybrid network can be initially configured as network routers. The initial configuration for each network node can be communicated to the other nodes in the network. Later during an operations phase of the network, also described in more detail below, internally-powered network devices originally configured during the initialization phase as non-routing nodes can determine if the node needs to promote itself to become a routing node, if that particular node needs to provide routing services to other nodes. Alternatively, internally-powered network devices originally configured during the initialization phase as routing nodes can determine if the node needs to demote itself to become a non-routing node, if that particular node is not needed for routing services to other nodes. These aspects and features of a particular example embodiment are described in more detail below.

Initialization Phase

A particular embodiment includes an initialization phase during which network devices are initially configured. In the initialization phase, the network devices can automatically configure themselves in such a way that connectivity among the routers (i.e., network devices initially configured as network routers as described above) can be established and a data routing backbone can be built for the network. This initialization operation can be achieved using one of two methods in an example embodiment.

Initialization Method 1:

In a first initialization method, all network devices, including externally-powered and internally-powered network devices, initially advertise their availability as routers to other network devices in the network. Thus, in the first initialization method, all network devices are initially configured as routers. Eventually, during the operations mode, some of the internally-powered nodes can automatically determine that they are not needed (or not needed often enough) to justify the power consumption needed to maintain these nodes as routers. In this case, these internally-powered nodes that determine that they are not needed as routers can demote themselves and stop further routing. The self-demoted nodes can advertise their unavailability for routing to the other network nodes. The other network nodes that are still routing nodes can adjust their routing logic to find new pathways and avoid further routing through the demoted node. The first initialization method of a particular embodiment is described in more detail below.

In the first initialization method, each network device can start by sending beacons to other network devices that announce the presence of the sending network device. Each beacon contains information about the type of the sending network device and the current role of the sending network device. If a first network device can directly reach (i.e., has a direct data path to) an externally-powered network device, the first network device can select that externally-powered network device as the primary router for the first network device. If the first network device cannot directly reach an externally-powered network device, the first network device can then select a proximate internally-powered network device configured for routing as the primary router for the first network device. The first network device can select a proximate internally-powered network device that is closest to an externally-powered router.

Once the initial routing configurations have been made as described above, the first initialization method provides for the internally-powered network devices initially configured as routers to demote themselves to be non-routers, when necessary or prudent. Demotion can be achieved in several ways. In a first demotion method, each network device that plans to route through an internally-powered network device sends a message to that internally-powered network device, indicating the routing needs of the sending network device. The internally-powered network device can send an acknowledgement to the sending network device, indicating that the internally-powered network device can provide the requested routing service. Internally-powered network devices that do not receive any request for routing for a pre-determined time period or do not receive enough requests for routing for a pre-determined time period can demote themselves to be non-routers, and can sleep for a longer time, thereby conserving internal power. In a second demotion method, the internally-powered network device can implicitly assume that it needs to remain as a router. The internally-powered network device can monitor network traffic for a pre-determined amount of time. Once the internally-powered network device determines that it has not received any routing requests (or enough routing requests) over this pre-determined amount of time, the internally-powered network device can demote itself to be a non-router as described above. The self-demoted network device can advertise its unavailability for routing to other network devices in the network.

Initialization Method 2:

In a second initialization method, only the externally-powered network devices initially advertise their availability as routers to other network devices in the network. Thus, in the second initialization method, only the externally-powered network devices are initially configured as routers. Eventually, during the operations mode, some of the internally-powered nodes can automatically determine that they are needed (or needed often enough) to justify the power consumption needed to maintain these nodes as routers. In this case, these internally-powered nodes that determine that they are needed as routers can promote themselves and start network routing operations. The self-promoted nodes can advertise their availability for routing to the other network nodes. The other network nodes that are also routing nodes can adjust their routing logic to find new pathways and route through the promoted node, if routing efficiencies can thereby be realized. The second initialization method of a particular embodiment is described in more detail below.

In the second initialization method, all externally-powered network devices select themselves as routers and start by sending beacons to other network devices that announce their intent to provide routing services. Each beacon contains information about the type of the sending network device and the current role of the sending network device. Internally-powered network devices can actively monitor these beacons. If a first network device can directly reach (i.e., has a direct data path to) an externally-powered network device, the first network device can select that externally-powered network device as the primary router for the first network device. However, if the first network device does not hear (i.e., does not receive a beacon) from a router, the first network device will need to proactively form a data path connection to the nearest externally-powered router. The first network device can achieve this data path connection by periodically sending a beacon that contains a request for routing services. Network devices in the neighborhood (i.e., proximate to the first network device) that can hear this beacon, and have a direct data path to an externally-powered router promote themselves as routers. These newly promoted routers can start sending beacons announcing their availability as routers. Other internally-powered network devices can now choose these newly promoted routers as their primary router. One of several implementations can be used to decide which internally-powered network devices should respond to routing service requests. In one implementation, all internally-powered network devices respond by becoming routers, and then self-demote themselves if they are not used sufficiently as routers. In another implementation, the internally-powered network devices randomly select themselves to be routers, and then self-demote themselves if they are not used sufficiently as routers. In yet another implementation, the internally-powered network devices perform a leader selection process to self-select a pre-determined number of routers, and then self-demote themselves if they are not used sufficiently as routers.

Operations Phase

In a particular embodiment during the operations phase, network devices can use their nearest neighbor routing node (e.g., either an externally-powered node or an internally-powered node) to route information. As described above, network devices can determine a primary router that best suits a power-conserving network routing policy. In the operations phase, devices periodically connect with their primary router and provide their status. As described above, internally-powered network devices can also promote or demote themselves as routers or non-routers, depending on the routing requirements of a particular hybrid network. In exceptional circumstances, such as router failures or router additions, other network devices need to adapt by either promoting or demoting their router status. These aspects of a particular embodiment are described in more detail below.

Router Additions:

The addition of externally-powered routers into the network may obviate the need for some internally-powered routers to continue acting in the role of routers. This is because the added externally-powered routers may provide routing services to the network devices in the neighborhood of other internally-powered routers. Upon addition to the network, externally-powered routers can start sending beacons announcing their availability for routing services. Internally-powered routers in the neighborhood can hear the beacon from the added externally-powered router and may select the added externally-powered router over their existing internally-powered routers for subsequent routing services. The internally-powered routers in the neighborhood can demote themselves by determining that their routing services are no longer needed, given the presence of the added externally-powered router. The internally-powered routers in the neighborhood can determine that their routing services are no longer needed based on either, (a) explicitly hearing beacons from neighboring routing network devices, or (b) observing the packet traffic routed through the internally-powered router and determining that the packet flow rate through the router does not justify the power consumption needed to maintain the nodes as a router.

Router Failure:

A router failure may cause a portion of the network to be unreachable. In these cases, additional routers need to be identified. Network devices that cannot reach (i.e., cannot establish a data path to) an externally-powered router can start to periodically send a beacon that contains requests for routing services. Network devices in the neighborhood that can hear this beacon, and have a path to an externally-powered router can promote themselves as routers, and start sending the beacons announcing their availability as routers. Other network devices in the neighborhood can now choose to use these promoted network devices for routing services. One of several implementations can be used to decide which internally-powered network devices should respond to routing service requests. In one implementation, all internally-powered network devices respond by becoming routers, and then self-demote themselves if they are not used sufficiently as routers. In another implementation, the internally-powered network devices randomly select themselves to be routers, and then self-demote themselves if they are not used sufficiently as routers. In yet another implementation, the internally-powered network devices perform a leader selection process to self-select a pre-determined number of routers, and then self-demote themselves if they are not used sufficiently as routers.

Figure 5:
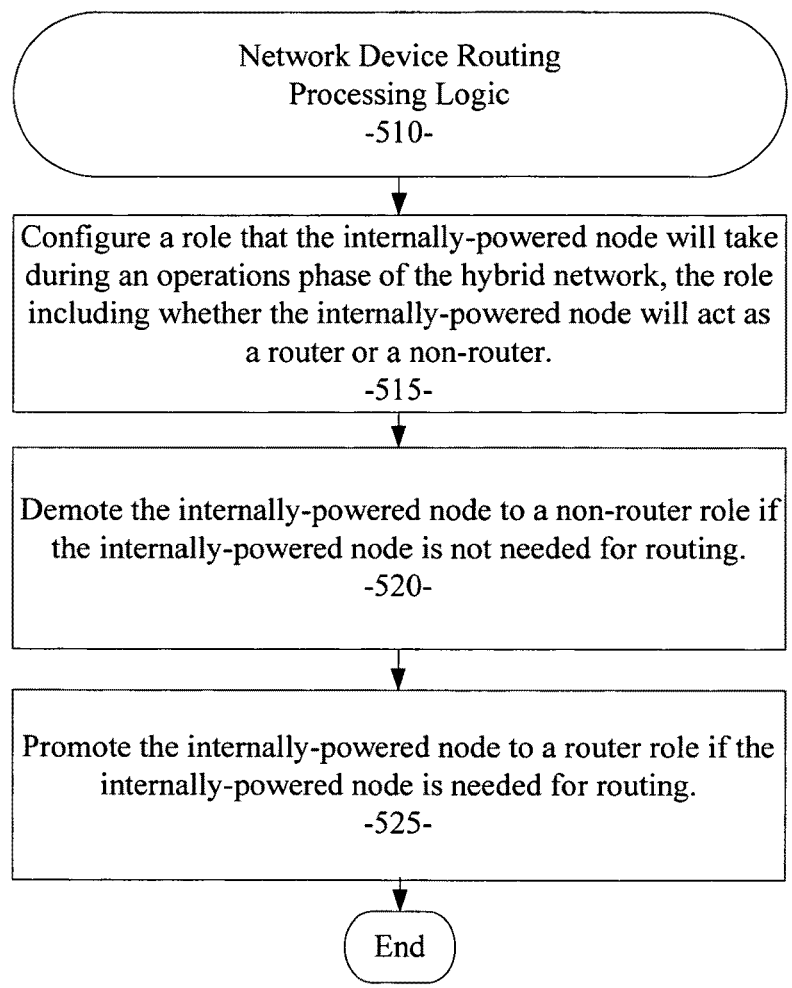
FIG. 5 is a flow diagram illustrating the processing flow for a particular example embodiment.

FIG. 5 is a flow diagram illustrating the basic processing flow 510 for a particular embodiment. As shown, an example embodiment includes configuring a role that the internally-powered node will take during an operations phase of the hybrid network, the role including whether the internally-powered node will act as a router or a non-router (processing block 515); demoting the internally-powered node to a non-router role if the internally-powered node is not needed for routing (processing block 520); and promoting the internally-powered node to a router role if the internally-powered node is needed for routing (processing block 525).

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a node configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations. Accordingly, the term "module" should be understood to encompass a functional entity, be that an entity that is physically constructed, permanently configured (e.g., hardwired) or temporarily configured (e.g., programmed) to operate in a certain manner and/or to perform certain operations described herein.

While the machine-readable medium 219 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

As noted, the software and/or related data may be transmitted over a network using a transmission medium. The term "transmission medium" shall be taken to include any medium that is capable of storing, encoding or carrying instructions for transmission to and execution by the machine, and includes digital or analog communication signals or other intangible media to facilitate transmission and communication of such software and/or data.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, as described herein, an apparatus and method for managing packet routing through internally-powered network devices in wireless sensor networks is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
   receiving a synchronous timing message from a gateway as broadcast in a global data communication to a plurality of externally-powered nodes and a plurality of internally-powered nodes in a hybrid network, the global data communication occurring only at specific times and on specific channels;
   initially configuring the plurality of externally-powered nodes and the plurality of internally-powered nodes as routers in a router role during an initialization phase, each of the plurality of internally-powered nodes selecting a primary node for message routing, the primary node being one of the plurality of externally-powered nodes if there is a direct data path to the one of the plurality of externally-powered nodes, the primary node being one of the plurality of internally-powered nodes if there is not a direct data path to one of the plurality of externally-powered nodes;
   each of the plurality of internally-powered nodes periodically connecting with their selected primary node to provide a status update during an operations phase;
   demoting the internally-powered node to a non-router role during the operations phase if the internally-powered node has received a beacon from a neighboring node or the internally-powered node has not received a pre-determined number of routing requests over a pre-determined amount of time; and
   promoting the internally-powered node to a router role during the operations phase if the internally-powered node has received at least a pre-determined number of routing requests over a pre-determined amount of time.

2. The method as claimed in claim 1 including routing data through one of the plurality of externally-powered nodes and one of the plurality of internally-powered nodes when the nodes are in a router role.

3. The method as claimed in claim 1 including enabling one of the plurality of internally-powered nodes to advertise the role to other network devices in the hybrid network.

4. The method as claimed in claim 1 including enabling one of the plurality of internally-powered nodes to automatically determine on its own that the node is not needed for routing and can demote itself to a non-router role.

5. The method as claimed in claim 1 including enabling one of the plurality of internally-powered nodes to automatically determine on its own that the node is needed for routing and can promote itself to a router role.

6. An internally-powered node comprising: a processor; a network interface, coupled to the processor, to communicate with other nodes of a hybrid network; and processing logic, executed by the processor, to receive a synchronous timing message from a gateway as broadcast in a global data communication to a plurality of externally-powered nodes and a plurality of internally-powered nodes in the hybrid network, the global data communication occurring only at specific times and on specific channels, to initially configure the internally-powered node as a router in a router role during an initialization phase, the internally-powered node selecting a primary node for message routing, the primary node being one of the plurality of externally-powered nodes if there is a direct data path to the one of the plurality of externally-powered nodes, the primary node being a different internally-powered node if there is not a direct data path to one of the plurality of externally-powered nodes, the internally-powered node periodically connecting with the selected primary node to provide a status update during an operations phase, to demote the internally-powered node to a non-router role during the operations phase if the internally-powered node has received a beacon from a neighboring node or the internally-powered node has not received a pre-determined number of routing requests over a pre-determined amount of time, and to promote the internally-powered node to a router role during the operations phase if the internally-powered node has received at least a pre-determined number of routing requests over a pre-determined amount of time.

7. The internally-powered node as claimed in claim 6 being further configured to route data through one of the plurality of externally-powered nodes and the internally-powered node when the nodes are in a router role.

8. The internally-powered node as claimed in claim 6 being further configured to advertise the role to other network devices in the hybrid network.

9. The internally-powered node as claimed in claim 6 being further configured to automatically determine on its own that the node is not needed for routing and can demote itself to a non-router role.

10. The internally-powered node as claimed in claim 6 being further configured to automatically determine on its own that the node is needed for routing and can promote itself to a router role.

11. The internally-powered node as claimed in claim 6 being powered by a battery.

12. A hybrid network comprising:
    a gateway;
    a plurality of externally-powered nodes in data communication with the gateway; and
    a plurality of internally-powered nodes in data communication with the gateway, at least one of the plurality of internally-powered nodes including processing logic to receive a synchronous timing message from the gateway as broadcast in a global data communication to the plurality of externally-powered nodes and the plurality of internally-powered nodes in the hybrid network, the global data communication occurring only at specific times and on specific channels, to initially configure the at least one of the plurality of internally-powered nodes as a router in a router role during an initialization phase, the at least one of the plurality of internally-powered nodes selecting a primary node for message routing, the primary node being one of the plurality of externally-powered nodes if there is a direct data path to the one of the plurality of externally-powered nodes, the primary node being a different internally-powered node if there is not a direct data path to one of the plurality of externally-powered nodes, the at least one of the plurality of internally-powered nodes periodically connecting with the selected primary node to provide a status update during an operations phase, to demote the at least one of the plurality of internally-powered nodes to a non-router role during the operations phase if the at least one of the plurality of internally-powered nodes has received a beacon from a neighboring node or the at least one of the plurality of internally-powered nodes has not received a pre-determined number of routing requests over a pre-determined amount of time, and to promote the at least one of the plurality of internally-powered nodes to a router role during the operations phase if the at least one of the plurality of internally-powered nodes has received at least a pre-determined number of routing requests over a pre-determined amount of time.

13. The hybrid network as claimed in claim 12 being further configured to route data through the plurality of externally-powered nodes and the plurality of internally-powered nodes when the nodes are in a router role.

14. The hybrid network as claimed in claim 12 being further configured to advertise the role to other network devices in the hybrid network.

15. The hybrid network as claimed in claim 12 wherein the at least one of the plurality of internally-powered nodes being further configured to automatically determine on its own that the node is not needed for routing and can demote itself to a non-router role.

16. The hybrid network as claimed in claim 12 wherein the at least one of the plurality of internally-powered nodes being further configured to automatically determine on its own that the node is needed for routing and can promote itself to a router role.

17. A non-transitory machine-readable storage medium having machine executable instructions embedded thereon, which when executed by a machine, cause the machine to:
   receive a synchronous timing message from a gateway as broadcast in a global data communication to a plurality of externally-powered nodes and a plurality of internally-powered nodes in a hybrid network, the global data communication occurring only at specific times and on specific channels;
   initially configure the plurality of externally-powered nodes and the plurality of internally-powered nodes as routers in a router role during an initialization phase, each of the plurality of internally-powered nodes selecting a primary node for message routing, the primary node being one of the plurality of externally-powered nodes if there is a direct data path to the one of the plurality of externally-powered nodes, the primary node being one of the plurality of internally-powered nodes if there is not a direct data path to one of the plurality of externally-powered nodes;
   each of the plurality of internally-powered nodes periodically connecting with their selected primary node to provide a status update during an operations phase;
   demote the internally-powered node to a non-router role during the operations phase if the internally-powered node has received a beacon from a neighboring node or the internally-powered node has not received a pre-determined number of routing requests over a pre-determined amount of time; and
   promote the internally-powered network node to a router role during the operations phase if the internally-powered network node has received at least a pre-determined number of routing requests over a pre-determined amount of time.

18. The non-transitory machine-readable storage medium as claimed in claim 17 being further configured to route data through the one of the plurality of externally-powered nodes and the one of the plurality of internally-powered nodes when the nodes are in a router role.

* * * * *